(12) United States Patent
Specht et al.

(10) Patent No.: US 9,960,455 B2
(45) Date of Patent: May 1, 2018

(54) FIRE PREVENTION OR FIRE EXTINGUISHING IN AN ELECTROCHEMICAL ENERGY STORAGE SYSTEM

(71) Applicant: KEY SAFETY SYSTEMS, INC., Sterling Heights, MI (US)

(72) Inventors: Martin Specht, Feldafing (DE); Klaus Meiler, Pocking (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 33 days.

(21) Appl. No.: 14/378,811

(22) PCT Filed: Feb. 14, 2013

(86) PCT No.: PCT/IB2013/000195
§ 371 (c)(1),
(2) Date: Aug. 14, 2014

(87) PCT Pub. No.: WO2013/121274
PCT Pub. Date: Aug. 22, 2013

(65) Prior Publication Data
US 2015/0017491 A1    Jan. 15, 2015

(30) Foreign Application Priority Data
Feb. 15, 2012    (DE) ................. 10 2012 003 017

(51) Int. Cl.
*H01M 10/42*    (2006.01)
*H01M 2/10*    (2006.01)
(Continued)

(52) U.S. Cl.
CPC .......... *H01M 10/4207* (2013.01); *A62C 3/16* (2013.01); *H01M 2/1077* (2013.01);
(Continued)

(58) Field of Classification Search
CPC ............... A62C 3/16; H01M 10/0525; H01M 10/4207; H01M 10/425; H01M 10/482;
(Continued)

(56) References Cited

U.S. PATENT DOCUMENTS

| 5,607,787 A * | 3/1997 | Wedlake | H01M 2/1094 429/120 |
| 2003/0049519 A1* | 3/2003 | Ishida | H01M 10/052 429/57 |

(Continued)

FOREIGN PATENT DOCUMENTS

WO    WO 9423800 A1 * 10/1994    ............ A62D 1/06

OTHER PUBLICATIONS

"Aero-K Fire Suppresion Aerosol Generators", FireCombat, 1999.*
(Continued)

*Primary Examiner* — Miriam Stagg
*Assistant Examiner* — Lilia Nedialkova
(74) *Attorney, Agent, or Firm* — Markell Seitzman

(57) ABSTRACT

A device for preventing or extinguishing a fire in an electrochemical energy storage system comprising storage cells arranged in a storage housing, in particular lithium-ion cells, wherein a composition of expandable volume, containing a chemical compound for preventing or extinguishing a fire, is disposed with limited volume in one or a plurality of hollow spaces in or on the storage housing, and expansion of the volume of the composition can be activated by sensors.

23 Claims, 1 Drawing Sheet

(52) U.S. Cl.
CPC ....... *H01M 10/425* (2013.01); *H01M 10/482* (2013.01); *H01M 10/486* (2013.01); *H01M 10/0525* (2013.01); *H01M 2200/00* (2013.01); *H01M 2200/10* (2013.01); *H01M 2220/20* (2013.01); *Y02E 60/122* (2013.01)

(58) Field of Classification Search
CPC ........... H01M 10/486; H01M 2200/00; H01M 2200/10; H01M 2200/20; H01M 2220/20; H01M 2/1077; Y02E 60/122
See application file for complete search history.

(56) References Cited

U.S. PATENT DOCUMENTS

| | | | | |
|---|---|---|---|---|
| 2005/0202292 | A1* | 9/2005 | Richards | H01M 8/04089 429/429 |
| 2010/0078182 | A1* | 4/2010 | Alkemade | A62C 99/0018 169/45 |
| 2010/0136391 | A1* | 6/2010 | Prilutsky | H01M 10/5004 429/62 |
| 2011/0250477 | A1* | 10/2011 | Yoshida | B60L 3/0046 429/61 |
| 2011/0308823 | A1* | 12/2011 | Seebaluck | A62C 99/0018 169/46 |
| 2012/0148879 | A1* | 6/2012 | Rich | H01M 8/04037 429/9 |

OTHER PUBLICATIONS

Agafonov, V., et al. "The Mechanism of Fire Suppression by Condensed Aerosols.", Proceedings of the 15th HOTC, NIST, pp. 984-993, published 2004.*
Machine translation of WIPO Patent Publication WO 9423800, published Oct. 1994.*

* cited by examiner

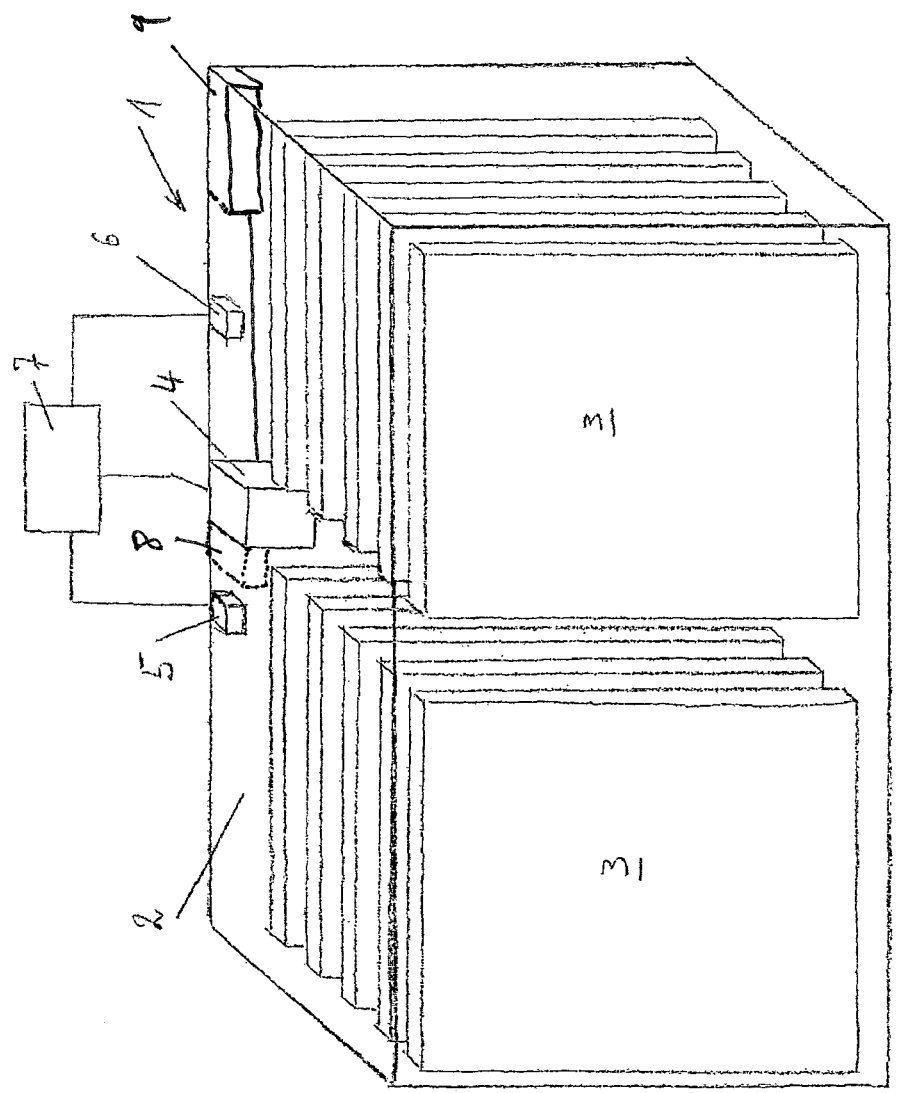

FIRE PREVENTION OR FIRE EXTINGUISHING IN AN ELECTROCHEMICAL ENERGY STORAGE SYSTEM

RELATED APPLICATIONS

This application is a US National filing under 35 U.S.C. section 371 claiming priority to International PCT Application Serial Number PCT/IB2013/000195 filed Feb. 14, 2013 and claims benefit of priority to DE 102012003017.7 filed Feb. 15, 2012.

The invention relates to fire prevention or fire extinguishing in an electrochemical energy storage system comprising storage cells arranged in a storage housing, in particular in lithium-ion cells.

Such energy storage systems are used, for example, in the form of "lithium batteries" in the automotive field as energy storage systems for powering electromotive drive units in motor vehicles. Such energy storage systems may generally be used to supply power to electrically driven devices, in particular to electromotive drives. In systems of this kind, a plurality of lithium-ion cells (for example 130 or more) in flat foil packages are grouped in blocks to form storage modules which are disposed in module housings. Like conventional batteries, each storage module has two connection terminals. Grouping cylindrical lithium-ion cells made of tightly wound layers to form a storage module is also known from the prior art.

A plurality of electrically interconnected storage modules forms the energy storage system which delivers, as a "battery", the electrical energy for powering the electromotive drive units of motor vehicles.

Thermal runaway and overheating may occur due to battery failure, for example after an accident, in particular due to internal short-circuiting. In many cases, the resultant fire hazard is not immediately discernible and may lead to a fire arising after a substantial delay of up to several days or weeks. As lithium is a highly reactive metal, conventional extinguishing agents cannot be used to extinguish such fires. Using an aqueous solution of calcium (Ca) salts and a fire extinguishing gel for fighting fires in lithium-ion battery cells is known from DE 10 2009 035 908 A1.

The object of the invention is to specify measures which can be applied efficaciously to prevent or extinguish a fire in an electromotive storage system containing lithium-ion cells, in particular.

This object is achieved by the features specified in claim 1. The dependent claims contain advantageous developments of the invention.

In the invention, in order to prevent or extinguish a fire in an electrochemical energy storage system, a composition of expandable volume is disposed with limited volume in one or a plurality of hollow spaces inside the storage housing or outside the storage housing. The expandable composition contains an extinguishing agent, in particular chemical compounds and/or a mineral or vitreous granulate, for preventing or extinguishing a fire. The expandable composition may also be prepared in such a way that it is suitable for preventing or extinguishing a fire in the energy storage system, in particular in the storage cells. A sensor unit, which detects any damage or destruction of the electrochemical energy storage system or its storage housing, for example, may be provided to activate expansion of the expandable composition such that the composition or the extinguishing agent contained therein for preventing or extinguishing a fire is brought to the respective critical location on or in the electrochemical energy storage system. The sensor unit may also be embodied in such a way that it detects any excessive acceleration or braking force, as may occur in an accident, for example, and then initiates activation of the expansion of the expandable composition.

Activation of expansion, for example by an electrical signal, may also be produced as the result of an algorithm with which the various signals from sensors in and around the vehicle are analysed. More specifically, what is analysed are signals such as those resulting from acceleration or braking forces acting on the vehicle or regions of the vehicle, for example from impacts or from stresses and strains arising in crash situations.

In the case of a pre-crash signal, the battery storage level can likewise be fetched by query, and expansion of the composition activated if necessary.

In order to activate expansion by means of sensors, the expandable composition may be embodied in a temperature-sensitive form such that expansion of the composition is activated at a particular minimum temperature. It is also possible for the sensor unit to generate an electrical signal with which expansion of the expandable composition is initiated.

Expandable compositions may be advantageously assigned to storage modules of the energy storage system, said storage modules comprising respective pluralities of storage cells. This ensures that, at the respective storage module involved, the risk of fire is eliminated, or that the fire itself is extinguished. To that end, the expandable composition may be disposed inside or also outside the housing of a respective storage module.

A discharge unit 9 may be advantageously provided on the energy storage system, or the energy storage system may be connected to a discharge unit, wherein the discharge energy of the discharge unit can be used to accelerate expansion of the composition. The discharge energy may also be used to activate expansion of the composition. In order to dispose the expandable composition in a limited volume, it may be disposed in one or more containers. It is also possible to provide the expandable composition as a coating containing the at least one fire-preventing or fire-extinguishing extinguishing agent in powder form, for example in a coating of paint.

It is also possible to provide the expandable composition as a shaped body, for example in tablet form.

The expandable composition may also include a dry propellant which preferably forms nitrogen when it expands. Examples of suitable propellants include sodium azide ($NaN_3$), guanidine nitrate or aminotetrazole compounds. One such propellant for filling airbags, for example, is known from the prior art. When the propellant provided in dried form is activated, it expands in gaseous form and cause the at least one extinguishing agent for preventing or extinguishing a fire to the respective critical location in the energy storage system.

The expandable composition may also include at least one gas or gas mixture held under pressure in one or more containers. The gas or gas mixture consists wholly or partially of inert gas, for example of argon and/or helium, and a gas mixture may comprise argon (98%) and helium (2%), for example. The gas or gas mixture may be held in readiness in a pressure vessel, together with the at least one extinguishing agent for preventing or extinguishing a fire. However, it is also possible to keep the gas or gas mixture in a separate container 8 and to guide it on expansion into the container in which the extinguishing agent is located.

The arrangement may be provided in a hybrid gas generator for filling an airbag, for example, i.e. the pressurised gas and the extinguishing agent can be mixed in a compressed gas tank. The mixture of the pressurised gas and the extinguishing agent may then be brought rapidly to the respective location in order to prevent or extinguish any fire in the battery.

In order to prevent a fire, the expandable compositions may include at least one substance as extinguishing agent, which stops any uncontrolled chemical reaction, in particular any exothermic reaction, in a respective storage cell. The expandable compositions may also include at least one substance which can form a barrier between the anode and the cathode of a respective storage cell, in particular when the separator or the electrolyte is destroyed. The substance may be a resin-forming substance, for example. This resin-forming substance may deposit itself on the electrode surfaces, for example, thus preventing any short circuits inside the cell.

In the invention, at least one aerosol-forming extinguishing agent may be used as an expandable composition or in the expandable composition to extinguish a fire. In the electrochemical energy storage system, this extinguishing agent is provided in or on the storage housing. The extinguishing agent may be disposed for this purpose in one or more hollow spaces inside the storage housing. The extinguishing agent may also be provided in one or more containers disposed on the outside of the storage housing. The aerosol-forming extinguishing agent is embodied in such a way that it can be activated at a specified minimum temperature above the operating temperature of the energy storage system, for example at 150° C. or higher, or by an electrical signal. The electrical signal can be generated by a temperature sensor disposed in the storage housing.

Due to the rapid expansion of the extinguishing agent when forming aerosol, for example, the extinguishing agent may be disposed in small containers inside the housing that surrounds the energy storage system, in particular the battery system. The extinguishing agent may also be accommodated in each of the housings provided for the storage modules. In this way, local seats of fire can be extinguished rapidly and efficaciously. If the containers for extinguishing agent are disposed on the outside of the storage housing, the extinguishing agent is likewise brought to the seat of the fire inside the housing due to its rapid expansion.

A distribution system may be provided, for example in the housing wall, or a system of piping with valve inlets may be provided in the modules, in order to bring the chemical compound for preventing or extinguishing a fire to the respective critical location in or on the energy storage system.

An aerosol-forming composition, for example, contains microparticles which may be suspended in an inert gas. The ratio of exposed surface area to mass is relatively high, so the amount of active material required to extinguish a fire can be kept to a minimum. The microparticles remain suspended in the gas for a relatively long time, so they can penetrate the natural convection flows that exist when combustion occurs. The composition may be provided in unpressurised form in a container, or in pressurised form in a pressure vessel.

In the case of an aerosol-forming composition, a substance is preferably used which forms a solid aerosol that is transformed upon activation into a rapidly expanding aerosol based on potassium compounds, for example. This composition may be disposed in one or more unpressurised containers for extinguishing agent, preferably inside the storage housing. For this purpose, the composition may be provided in one or more hollow spaces inside the storage housing. The composition is preferably assigned to respective storage modules, the composition preferably being disposed inside the respective storage module housing. The composition may also be provided as a coating, or in the form of tablets or pellets.

A discharge unit which supplies discharge energy for distributing the fire-extinguishing aerosol when extinguishing a fire may preferably be provided on the energy storage system.

Fire extinguishing using extinguishing agents that contain potassium compounds is based on the fact that any potassium which is released in a fire by the decomposition of the potassium compounds will react with free radicals produced during combustion to form potassium hydroxide, which is a very stable compound. The chain reaction of the free radicals produced during combustion is stopped as a result and the fire is extinguished.

Such aerosol-forming compositions are used in fire extinguishers for fighting fires in enclosed spaces. The fire extinguishers and fire extinguishing systems are commercially obtainable as FIRE-PRO® and STAT X®.

In DE 196 34 006 C2, there is also described a suitable aerosol-forming composition which contains the following, in mass percent:

| | |
|---|---|
| Potassium nitrate | 67-72 |
| Dicyanodiamide | 9-16 |
| Phenol formaldehyde resin | 8-12 |
| Potassium benzoate, bicarbonate or hexacyanoferrate | 4-12. |

In this case, dicyanodiamide is the gas-aerosol-forming substance.

The expandable composition containing the extinguishing agent for preventing or extinguishing a fire may preferably be disposed in such a way that expansion of the composition can be activated twice or more times in succession. In this way, any subsequent fire that may arise after extinguishing a fire can again be extinguished. To that end, the expandable composition may be disposed in two or more units which can be successively activated. This plurality of units may be provided in one or more respective containers.

The extinguishing agent which is used to prevent or extinguish a fire may also include a mineral or vitreous granulate. This granulate may form the extinguishing agent on its own or in combination with a chemical substance used for preventing or extinguishing a fire, for example the potassium compound as described above. The granulate preferably has a grain size of less than 0.5 mm. Even more preferably, the granulate has a grain size of less than 0.2 mm. The granulate may be provided in the form of hollow microspheres. Production of such a granulate is known from EP 1 832 560 A2, for example.

The attached FIGURE shows an electrochemical energy storage system 1, which can be a battery for a vehicle, in particular for a motor vehicle. However, it may also be a battery which is deployed in a stationary manner. Storage cells 3 are arranged in a storage housing 2 of energy storage system 1. The cells may be lithium-ion cells, for example. Inside the housing, a container 4 is disposed in which a composition of expandable volume, preferably in a compact form, is held in readiness. This composition may be an extinguishing agent for preventing or extinguishing a fire. It may be a chemical substance which is used to prevent or extinguish the fire. The extinguishing agent for preventing or extinguishing the fire is distributed inside storage housing 2 by means of a propellant. However, it is also possible to provide a container 4 containing the expandable composition for each storage cell 3, or for each pack consisting of a plurality of storage cells 3. Container 4 may also be disposed on the outside of storage housing 2.

As an extinguishing agent, the expandable composition inside housing 4 may also include a mineral or vitreous granulate. Not only the mineral or vitreous granulate, but also the chemical substance used to prevent or extinguish the fire may be used for the extinguishing agent.

Expansion of the volume of the composition provided in container 4 can be activated by sensors. One or more sensors may be provided for that purpose. For example, one or more temperature sensors 5 and/or one or more acceleration sensors 6 may be provided. In this way, it is possible to detect any excessive temperature in storage housing 2. It is also possible to detect any excessive braking or acceleration force, in particular any damage caused to energy storage system 1 or to storage cells 3. Sensors 5, 6 are connected to an analyser/controller 7, which can be an electronic computer device, for example the on-board computer in a vehicle. In analyser/controller 7, the signals from the sensors are analysed with regard to the prevention or extinguishing of a fire in or on energy storage system 1, and the respective control signals for initiating expansion of the volume of the composition kept in container 4 are supplied accordingly.

The invention claimed is:

1. A device for preventing or extinguishing a fire in an electrochemical energy storage system comprising storage cells arranged in a storage housing wherein
   a composition of expandable volume, containing an extinguishing agent for preventing or extinguishing a fire, is disposed with limited volume in one or more containers, which are disposed in one or a plurality of hollow spaces in or on the storage housing, wherein expansion of the volume of the composition can be activated by an electrical signal by a sensor, and wherein the extinguishing agent for preventing or extinguishing a fire includes a chemical compound which reacts with radicals released by the fire to form at least one stable compound,
   wherein the expandable composition is an aerosol-forming composition and includes a gas mixture held under pressure in said one or more containers, the gas mixture comprising argon and helium, and wherein
   the gas mixture is kept in a separate container and guided on expansion into a second container in which the extinguishing agent is located.

2. The device according to claim 1, wherein the expandable composition is activated at a specified minimum temperature.

3. The device according to claim 1, wherein expandable compositions are assigned to storage modules of the energy storage system, said storage modules comprising respective pluralities of storage cells.

4. The device according to claim 1, wherein the expandable composition is disposed inside the housing of a respective storage module.

5. The device according to any claim 1, wherein a discharge unit is provided on the energy storage system, or the energy storage system can be connected to a discharge unit, and the discharge energy of the discharge unit can be used for expanding the composition.

6. The device according to claim 1, wherein the expandable composition is provided as a coating.

7. The device according to claim 1, wherein the expandable composition is provided as a shaped body in tablet form.

8. The device according to claim 1, wherein the expandable composition includes at least one alkali metal compound.

9. The device according to claim 1, wherein the expandable composition includes potassium nitrate.

10. The device according to claim 1, wherein the extinguishing agent for preventing or extinguishing a fire includes a mineral or vitreous granulate.

11. The device according to claim 10, wherein the granulate has a grain size of less than 0.5 mm.

12. The device according to claim 1, wherein the expandable composition includes a dry propellant.

13. The device according to claim 12, wherein the propellant forms nitrogen when it expands.

14. The device according to claim 1 further comprises a sensor unit suitable for activating the expandable composition, the sensor unit being sensitive to an excessive acceleration or braking force acting on the electrochemical storage system, or sensitive to any damage occurring in or caused to the electrochemical storage system.

15. The device according to claim 14 further comprises an expandable composition having one or more of the following components:
   at least one substance preventing an uncontrolled chemical reaction in a respective storage cell;
   at least one substance extinguishing a fire in the energy storage system;
   at least one substance forming a barrier between the anode and the cathode of a respective storage cell;
   at least one aerosol-forming substance;
   at least one dry propellant which can be converted by activation to a gaseous form;
   at least one gas or gas mixture which is held under pressure.

16. The device according to claim 15 wherein the fire-extinguishing substance includes at least one potassium compound which decomposes during combustion to release potassium, which reacts with free radicals produced during combustion to form stable potassium hydroxide, and/or includes a mineral or vitreous granulate.

17. The device according to claim 16 further comprises an arrangement which activates expansion of the composition twice or more times.

18. A device for preventing or extinguishing a fire in an electrochemical energy storage system comprising storage cells arranged in a storage housing wherein a composition of expandable volume, containing an extinguishing agent for preventing or extinguishing a fire, is disposed with limited volume in one or more containers, which are disposed in one or a plurality of hollow spaces in or on the storage housing, wherein expansion of the volume of the composition can be activated by an electrical signal by a sensor,
   wherein the expandable composition is an aerosol-forming composition and includes potassium nitrate and includes a gas mixture held under pressure in said one or more containers, the gas mixture comprising argon and helium, and wherein the gas mixture is kept in a separate container and guided on expansion into a second container in which the extinguishing agent is located.

19. The device according to claim 18, wherein the expandable composition is activated at a specified minimum temperature.

20. The device according to claim 18, wherein expandable compositions are assigned to storage modules of the energy storage system, said storage modules comprising respective pluralities of storage cells.

21. The device according to claim 18, wherein the expandable composition is disposed inside the housing of a respective storage module.

22. The device according to any claim 18, wherein a discharge unit is provided on the energy storage system, or the energy storage system can be connected to a discharge unit, and the discharge energy of the discharge unit can be used for expanding the composition.

23. The device according to claim 18, wherein the expandable composition is provided as a coating.

* * * * *